(12) United States Patent
Lee et al.

(10) Patent No.: US 9,666,151 B2
(45) Date of Patent: May 30, 2017

(54) DISPLAY DEVICE

(71) Applicant: Samsung Display Co., Ltd., Yongin (KR)

(72) Inventors: Hyoung Sub Lee, Yongin-si (KR); Sung Hee Hong, Hwaseong-si (KR); Joo Young Yoon, Suwon-si (KR); Seung-Yeon Chae, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 79 days.

(21) Appl. No.: 14/709,040

(22) Filed: May 11, 2015

(65) Prior Publication Data

US 2016/0189645 A1    Jun. 30, 2016

(30) Foreign Application Priority Data

Dec. 29, 2014 (KR) .................... 10-2014-0192096

(51) Int. Cl.
*G02F 1/13*     (2006.01)
*G09G 3/36*     (2006.01)

(52) U.S. Cl.
CPC ............ *G09G 3/3648* (2013.01); *G02F 1/13* (2013.01); *G09G 2300/0426* (2013.01); *G09G 2300/0447* (2013.01); *G09G 2300/0465* (2013.01); *G09G 2300/0852* (2013.01)

(58) Field of Classification Search
CPC .... G09G 3/3648; G02F 1/13; G02F 1/133377
See application file for complete search history.

(56) References Cited

U.S. PATENT DOCUMENTS

| | | | |
|---|---|---|---|
| 7,471,364 B2 | 12/2008 | Park et al. | |
| 2012/0062448 A1* | 3/2012 | Kim ................ | G02F 1/133377 345/55 |
| 2013/0334543 A1 | 12/2013 | Kim et al. | |
| 2014/0104532 A1 | 4/2014 | Cho et al. | |
| 2015/0077687 A1* | 3/2015 | Chiang ............ | G02F 1/133512 349/110 |

FOREIGN PATENT DOCUMENTS

| | | |
|---|---|---|
| KR | 10-2006-0086742 | 8/2006 |
| KR | 10-2008-0068619 | 7/2008 |
| KR | 10-2012-0026880 | 3/2012 |
| KR | 10-2013-0141097 | 12/2013 |
| KR | 10-2014-0048731 | 4/2014 |

* cited by examiner

*Primary Examiner* — James Dudek
(74) *Attorney, Agent, or Firm* — H.C. Park & Associates, PLC (57) ABSTRACT

A display device including a substrate, and pixels disposed on the substrate, each of the pixels including a first sub-pixel and a second sub-pixel, in which the first sub-pixel includes a first cover layer defining a first cavity on the substrate, a first liquid crystal layer disposed in the first cavity, and a first pixel electrode and a first common electrode configured to apply an electric field to the first liquid crystal layer, the second sub-pixel includes a second cover layer defining a second cavity on the substrate, a second liquid crystal layer disposed in the second cavity, and a second pixel electrode and a second common electrode configured to apply an electric field to the second liquid crystal layer, and a first distance between the first pixel electrode and the first common electrode is different from a second distance between the second pixel electrode and the second common electrode.

20 Claims, 7 Drawing Sheets

DISPLAY DEVICE

CROSS-REFERENCE TO RELATED APPLICATION

This application claims priority from and the benefit of Korean Patent Application No. 10-2014-0192096, filed on Dec. 29, 2014, which is hereby incorporated by reference for all purposes as if fully set forth herein.

BACKGROUND

Field

Exemplary embodiments of the present invention relate to a display device. More particularly, the exemplary embodiments of the present invention relates to a display device with improved aperture ratio.

Discussion of the Background

A liquid crystal display (LCD) device, which may be one of the widely used display devices, applies a voltage to two opposing electrodes (i.e., a pixel electrode and a common electrode) to control the alignment of liquid crystal molecules in a liquid crystal layer interposed between the two opposing electrodes, so as to adjust the amount of light transmitted through the liquid crystal layer. The LCD device may be formed to maintain a predetermined gap between two substrates to include the liquid crystal layer therebetween. Therefore, spacers may be formed between the two substrates.

However, bonding the spacers to one of the two substrates may complicate the fabrication of the LCD device and increase the manufacturing cost of the LCD device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a display device having a simplified structure and manufacturing processes, to improve display quality.

Additional aspects will be set forth in the detailed description which follows, and, in part, will be apparent from the disclosure, or may be learned by practice of the inventive concept.

According to an exemplary embodiment of the present invention, a display device includes a substrate, and pixels disposed on the substrate, each of the pixels including a first sub-pixel and a second sub-pixel, in which the first sub-pixel includes a first cover layer defining a first cavity on the substrate, a first liquid crystal layer disposed in the first cavity, and a first pixel electrode and a first common electrode configured to apply an electric field to the first liquid crystal layer, the second sub-pixel includes a second cover layer defining a second cavity on the substrate, a second liquid crystal layer disposed in the second cavity, and a second pixel electrode and a second common electrode configured to apply an electric field to the second liquid crystal layer, and a first distance between the first pixel electrode and the first common electrode is different from a second distance between the second pixel electrode and the second common electrode.

According to an exemplary embodiment of the present invention, a display device includes a substrate, and pixels disposed on the substrate, each of the pixels including a first sub-pixel and a second sub-pixel, in which the first sub-pixel includes a first pixel electrode disposed on the substrate, a first cover layer disposed on the first pixel electrode, the first cover layer defining a first cavity on the substrate, and a first common electrode disposed on a bottom surface of the first cover layer and facing the first pixel electrode, the second sub-pixel includes a second pixel electrode disposed on the substrate, a second cover layer disposed on the second pixel electrode, the second cover layer defining a second cavity on the substrate, and a second common electrode disposed on a bottom surface of the second cover layer and facing the second pixel electrode, and a first width of the first cavity in a direction perpendicular to the substrate is different from a second width of the second cavity in the direction perpendicular to the substrate.

According to the exemplary embodiments, a process of bonding the two substrates may not be required during the fabrication of a display device, and the amounts of substrates and liquid crystal material used in the manufacturing process may be reduced, thereby reducing the amount of time and costs in the fabrication of a display device.

In addition, since only one thin-film transistor (TFT) is used in each pixel, the aperture ratio and the display quality of a display device may be improved.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
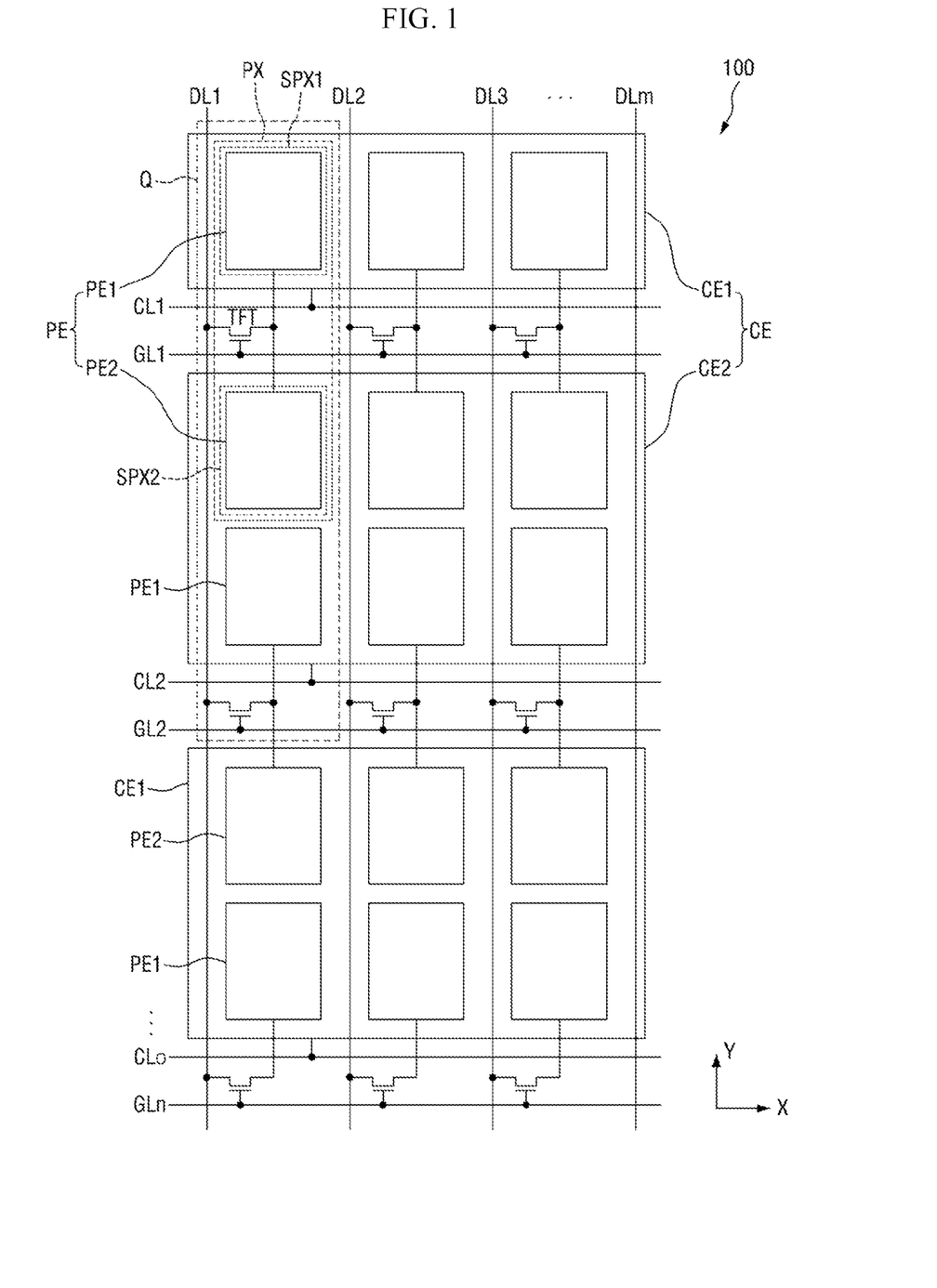
FIG. 1 is a schematic view of a display device according to an exemplary embodiment of the present invention.
Figure 2:
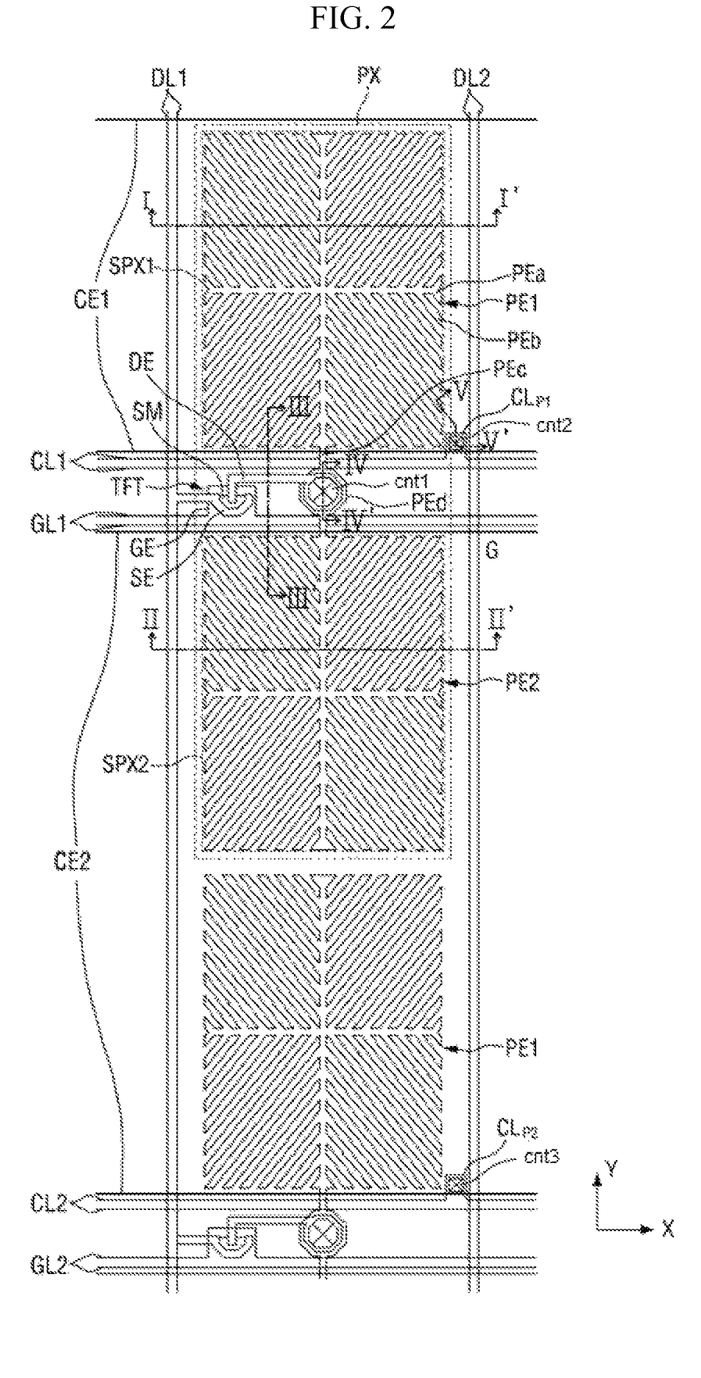
FIG. 2 is a layout of part of the display device illustrated in FIG. 1.
Figure 3:
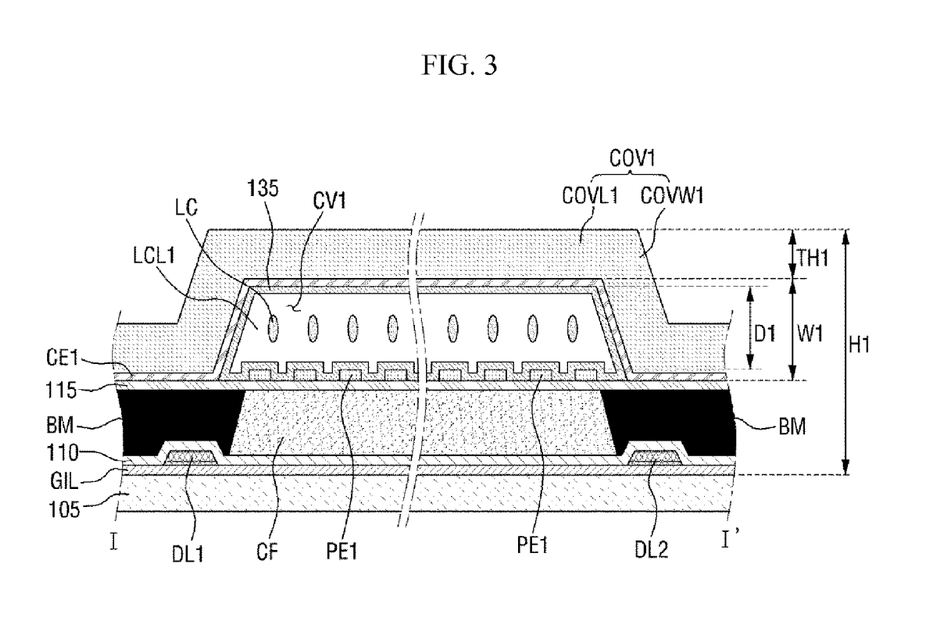
FIG. 3 is a cross-sectional view taken along line I-I' of FIG. 2.
Figure 4:
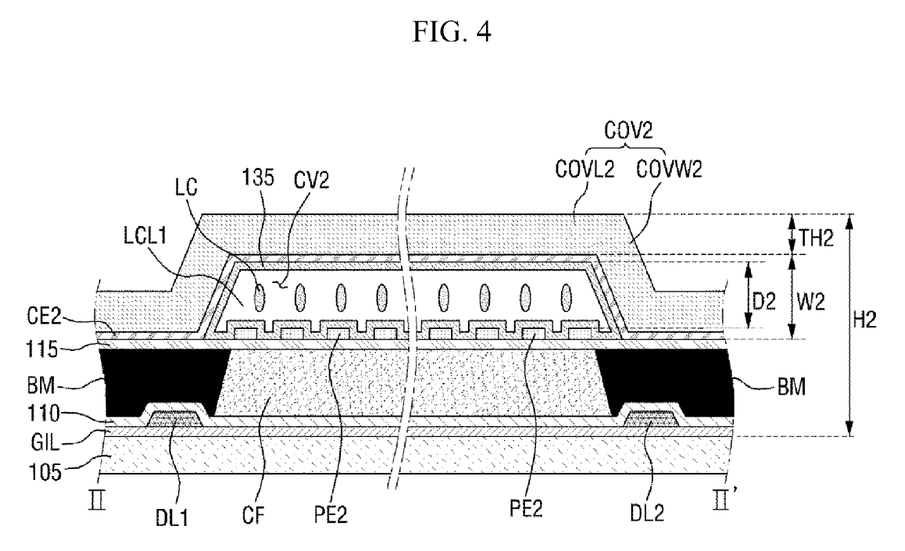
FIG. 4 is a cross-sectional view taken along line II-II' of FIG. 2.
Figure 5:
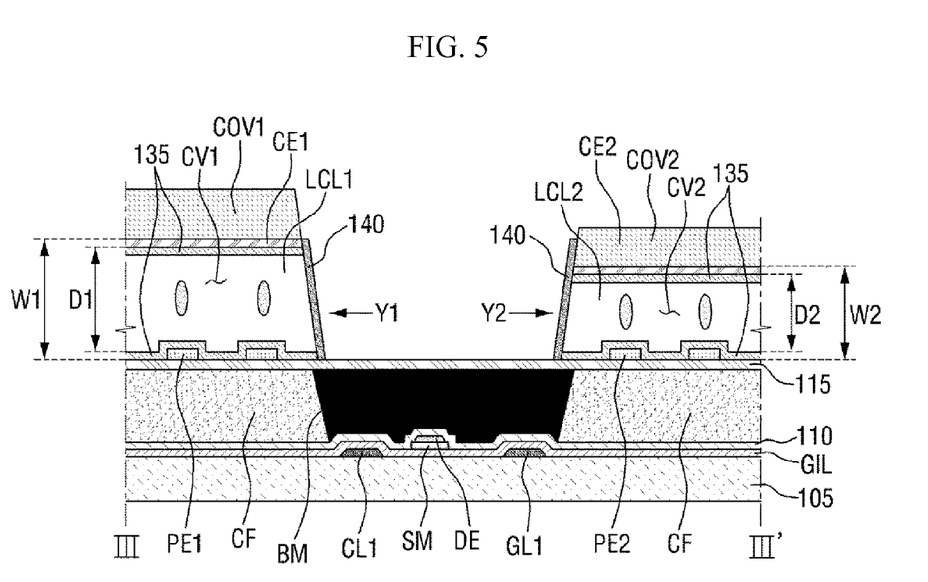
FIG. 5 is a cross-sectional view taken along line III-III' of FIG. 2.
Figure 6:
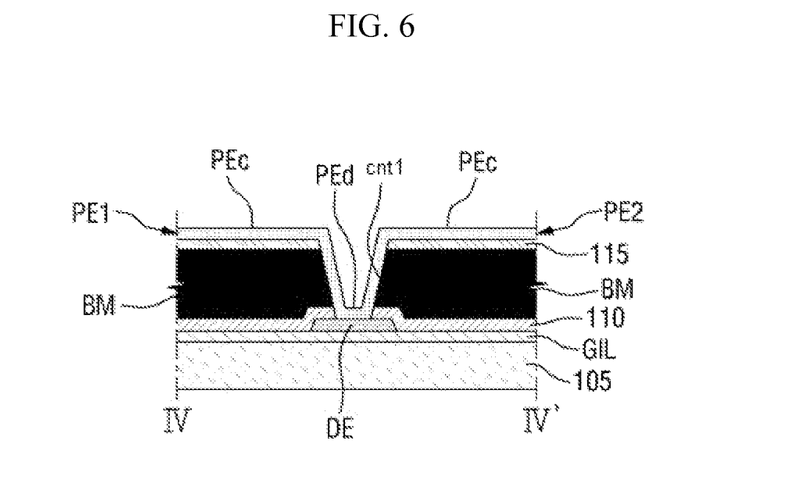
FIG. 6 is a cross-sectional view taken along line IV-IV' of FIG. 2.
Figure 7:
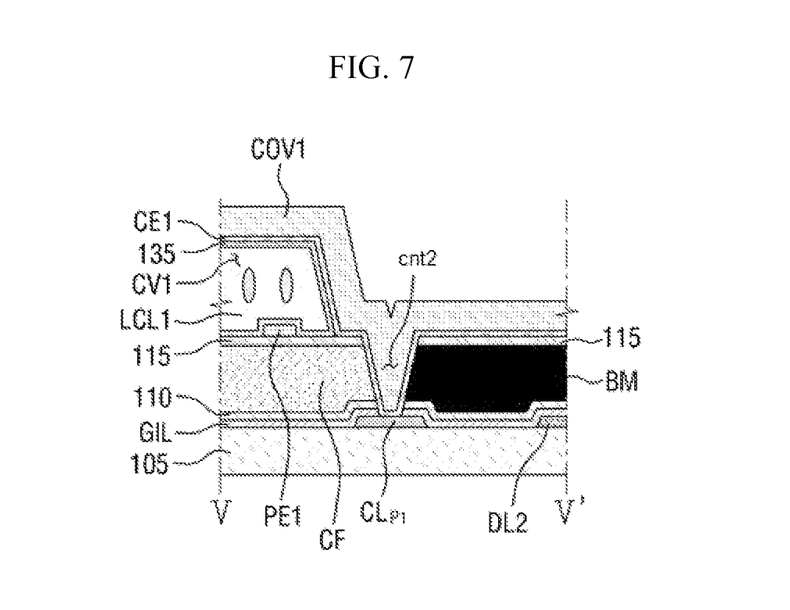
FIG. 7 is a cross-sectional view taken along line V-V' of FIG. 2.

FIG. 1 is a schematic view of a display device according to an exemplary embodiment of the present invention. FIG. 2 is a layout of the display device illustrated in FIG. 1, and particularly, a layout of part Q of FIG. 1. FIG. 3 is a cross-sectional view taken along line I-I' of FIG. 2. FIG. 4 is a cross-sectional view taken along line II-II' of FIG. 2. FIG. 5 is a cross-sectional view taken along line III-III' of FIG. 2. FIG. 6 is a cross-sectional view taken along line IV-IV' of FIG. 2. FIG. 7 is a cross-sectional view taken along line V-V' of FIG. 2.

Referring to FIGS. 1 to 7, a display device 100 according to an exemplary embodiment of the present invention may include a substrate 105, gate lines GL1, GL2, . . . , GLn, data lines DL1, DL2, . . . , DLm, common voltage lines CL1, CL2, . . . , CLo, a gate insulating layer GIL, thin-film transistors TFTs "TFT", an insulating layer 110, color filters CF, a black matrix BM, a protective layer 115, pixel electrodes PE, common electrodes CE, a cover layer (COV1 and COV2), an alignment layer 135, and a liquid crystal layer (LCL1 and LCL2).

The substrate 105 may be a transparent or opaque insulating substrate, such as a silicon substrate, a glass substrate, or a plastic substrate. The substrate 105 may be rigid or flexible. The substrate 105 may include pixel regions, and the pixel regions may correspond to pixels PX, respectively.

The pixels PX may be disposed on the substrate 105 to respectively correspond to the pixel regions. Each of the pixels PX may include a first sub-pixel SPX1 and a second sub-pixel SPX2.

The gate lines GL1, GL2, . . . , GLn may be disposed on the substrate 105 to extend in a first direction X, and may be spaced apart from each other in a second direction Y, which intersects the first direction X. The gate lines GL1, GL2, . . . , GLn may transmit gate signals to the TFTs "TFT". According to an exemplary embodiment of the present invention, the first and second sub-pixels SPX1 and SPX2 may be disposed next to each other in the second direction Y, and may have one of the gate lines GL1, GL2, . . . , GLn interposed therebetween. For example, the first and second sub-pixels SPX1 and SPX2 may be disposed above and below, respectively, the first gate line GL1 in a plan view.

The data lines DL1, DL2, . . . , DLm may be disposed on the substrate 105 to extend in the second direction Y, and be spaced apart from each other in the first direction X. The data lines DL1, DL2, . . . , DLm may be insulated from the gate lines GL1, GL2, . . . , GLn, and transmit data signals to the TFTs "TFT".

The common voltage lines CL1, CL2, . . . , CLo may be disposed on the substrate 105 to extend in the first direction X in parallel to the gate lines GL1, GL2, . . . , GLn. The common voltage lines CL1, CL2, . . . , CLo may be spaced apart from each other in the second direction Y. According to an exemplary embodiment of the present invention, the common voltage lines CL1, CL2, . . . , CLo may be disposed on a level with the gate lines GL1, GL2, . . . , GLn. The expression "A disposed on a level with B", as used herein, means that A and B are disposed on the same layer. Alternatively, the common voltage lines CL1, CL2, . . . , CLo may be disposed on a level with the data lines DL1, DL2, . . . , DLm. For convenience of description, hereinafter, the common voltage lines CL1, CL2, . . . , CLo and the gate lines GL1, GL2, . . . , GLn are assumed to be disposed on a level with each other. The common voltage lines CL1, CL2, . . . , CLo may be provided with the same common voltage.

The gate insulating layer GIL may be formed on the entire surface of the substrate 105, and cover the gate lines GL1, GL2, . . . , GLn and the common voltage lines CL1, CL2, . . . , CLo on the substrate 105. The gate insulating layer GIL may be formed of an insulating material. For example, the gate insulating layer GIL may include silicon nitride or silicon oxide. The gate insulating layer GIL may have a single-layer structure or a multilayer structure that includes a stack of two or more insulating layers. The data lines DL1, DL2, . . . , DLm may be disposed on the gate insulating layer GIL.

Each of the TFTs "TFT" may include a gate electrode GE, a semiconductor layer SM, a source electrode SE, and a drain electrode DE. According to an exemplary embodiment of the present invention, a TFT "TFT" may be disposed between the first and second sub-pixels SPX1 and SPX2 in a plan view.

The gate electrode GE may be formed to protrude from each of the gate lines GL1, GL2, . . . , GLn toward the semiconductor layer SM. The gate lines GL1, GL2, . . . , GLn and the gate electrode GE may include a metal, such as nickel (Ni), chromium (Cr), molybdenum (Mo), aluminum (Al), titanium (Ti), copper (Cu), tungsten (W), or an alloy thereof. The gate lines GL1, GL2, . . . , GLn and the gate electrode GE may be formed as a single or double layer using the metal, respectively. For example, the gate lines GL1, GL2, . . . , GLn and the gate electrode GE may be formed as a triple layer, by sequentially stacking Mo, Al, and Mo, a double layer by sequentially stacking Ti and Cu, or a single layer of an alloy of Ti and Cu.

The semiconductor layer SM may be provided on the gate electrode GE with the gate insulating layer GIL interposed therebetween. According to an exemplary embodiment of the present invention, the semiconductor layer SM may include an active layer, which is provided on the gate insulating layer GIL, and an ohmic contact layer, which is provided on the active layer. The semiconductor layer SM may be disposed between the gate insulating layer GIL and the data lines DL1, DL2, . . . , DLm.

The source electrode SE may be branched off from one of the data lines DL1, DL2, . . . , DLm, and at least partially overlap the corresponding gate electrode GE in a plan view. At least part of the source electrode SE may be disposed on the semiconductor layer SM. The drain electrode DE may be spaced apart from the source electrode SE, and at least partially overlap the gate electrode GE in a plan view. At least part of the drain electrode DE may be disposed on the semiconductor layer SM, and the drain electrode DE may be spaced apart from the source electrode SE. The semiconductor layer SM may form a conductive channel between the source electrode SE and the drain electrode DE.

The source electrode SE and the drain electrode DE may include a conductive material, for example, a metal. Each of the source electrode SE and the drain electrode DE may be formed of a single metal, two or more metals, or an alloy thereof. The two or more metals may include Ni, Cr, Mo, Al, Ti, Cu, W, and an alloy thereof. Each of the source electrode SE and the drain electrode DE may be formed as a single layer or a multilayer. For example, each of the source electrode SE and the drain electrode DE may be formed as a double layer of Ti and Cu.

The insulating layer 110 may be formed on the gate insulating layer GIL, and may have a through hole that exposes the drain electrode DE therethrough. The insulating layer 110 may cover an exposed top of the semiconductor layer SM. The insulating layer 110 may include silicon nitride or silicon oxide. According to an exemplary embodiment of the present invention, the insulating layer 110 may be omitted. Hereinafter, it is assumed that the display device 100 includes the insulating layer 110.

The color filters CF may provide a color to light transmitting through each of the pixels PX. Each of the color filters CF may include one of a red color filter, a green color filter, and a blue color filter. The color filters CF may be provided to correspond to each of the pixels PX, and particularly, each of the first and second sub-pixels SPX1 and SPX2. Alternatively, each of the color filters CF may provide a color other than red, green, and blue. According to an exemplary embodiment of the present invention, each of the color filters CF may also include a white color filter. The color filters CF may be arranged so that a pair of adjacent pixels PX may emit light of different colors.

The black matrix BM may be disposed on the insulating layer 110 to correspond to the boundaries of each of the pixels PX, and particularly, the boundaries of each of the first and second sub-pixels SPX1 and SPX2. The black matrix BM may be provided on at least one side of each of the color filters CF. For example, the black matrix BM may be arranged to surround each of the color filters CF. The black matrix BM may overlap the gate lines GL1, GL2, . . . , Gn, the data lines DL1, DL2, . . . , DLm, the common voltage lines CL1, CL2, . . . , Clo, and the TFTs "TFT" in a plan view. The black matrix BM may be formed of a light-blocking material to block the transmission of unwanted light in displaying an image. For example, the black matrix BM may prevent light leakages caused by abnormal behaviors of liquid crystal molecules in the boundaries of the liquid crystal layer (LCL1 and LCL2), or prevent color mixing defects that may occur at the boundaries of each of the color filters CF.

The protective layer 115 may be formed on the color filters CF and the black matrix BM, and planarize the color filters CF and the black matrix BM. The protective layer 115 may protect the color filters CF and the black matrix BM by preventing or minimizing the color filters CF and the black matrix BM from being damaged by an $O_2$ ashing process, which is performed at the last stage of the formation of cavities (CV1 and CV2) to remove any remaining sacrificial layer from each of the cavities (CV1 and CV2) into which liquid crystal molecules LC are injected. The cavities (CV1 and CV2) may be formed by forming a sacrificial layer on the protective layer 115 to correspond to the first and second sub-pixels SPX1 and SPX2, respectively, forming the cover layer (COV1 and COV2) on the sacrificial layer, and removing the sacrificial layer.

According to an exemplary embodiment of the present invention, the protective layer 115 may include at least one of silicon nitride (SiNx), silicon oxide (SiOx), and silicon oxynitride (SiOxNy). The protective layer 115 may have a single-layer structure or a multilayer structure. A first contact hole cnt1 may be formed through the protective layer 115 and the insulating layer 110 to expose the drain electrode DE therethrough. A second contact hole cnt2 and a third contact hole cnt3 may be formed through the protective layer 115, the insulating layer 110, and the gate insulating layer GIL, to expose a first protrusion $CL_{p1}$ of the first common voltage line CL1 and a second protrusion $CL_{p2}$ of the second common voltage line CL2, respectively.

The pixels PX may be provided on the substrate 105. Each of the pixels PX may include a first cover layer COV1, which defines a first cavity CV1 on the substrate 105, a second cover layer COV2, which defines a second cavity CV2 on the substrate 105, a first liquid crystal layer LCL1, which is provided in the first cavity CV1, a second liquid crystal layer LCL2, which is provided in the second cavity CV2, a first pixel electrode PE1 and a first common electrode CE1, which control the first liquid crystal layer LCL1, and a second pixel electrode PE2 and a second common electrode CE2, which control the second liquid crystal layer LCL2. Each of the pixels PX may also include the alignment layer 135, which aligns the liquid crystal molecules LC in each of the first and second liquid crystal layers LCL1 and LCL2.

Each of the pixel electrodes PE may be disposed on the protective layer 115, and may include first and second pixel electrodes PE1 and PE2, which are formed to correspond to the first and second sub-pixels SPX1 and SPX2, respectively. According to an exemplary embodiment of the present invention, the first and second pixel electrodes PE1 and PE2 may be spaced apart from each other by the first gate line GL1 and the first common voltage line CL1 interposed therebetween. The first and second pixel electrodes PE1 and PE2 may both be electrically connected to the drain electrode DE of the same TFT "TFT", and thus provided with the same voltage. According to an exemplary embodiment of the present invention, each of the first and second pixel electrodes PE1 and PE2 may include at least one stem electrode PEa, branch electrodes PEb extending from the stem electrode PEa, and an extension electrode PEc extending from the end of the stem electrode PEa toward the drain electrode DE. The branch electrodes PEb may extend in a predetermined direction to be in parallel to each other, and may be spaced apart from each other by a predetermined distance. Each of the pixel electrodes PE may also include a connecting electrode PEd, which electrically connects the extension electrodes PEc of the first and second pixel electrodes PE1 and PE2. The connecting electrode PEd may be electrically connected to the drain electrode DE via the first contact hole cnt1, which is formed through the protective layer 115 and the insulating layer 110. The shapes of the stem electrode PEa and the branch electrodes PEb of each of the first and second pixel electrodes PE1 and PE2 may vary. The pixel electrodes PE may include a transparent conductive material, such as an indium tin oxide (ITO) or indium zinc oxide (IZO).

A pair of adjacent first and second pixel electrodes PE1 and PE2 (in the second direction Y) from two different pixels PX may be disposed between a pair of gate lines, for example, the first and second gate lines GL1 and GL2, and be physically isolated from each other.

The cover layer (COV1 and COV2) may include a first cover layer COV1 disposed on a first pixel electrode PE1, and a second cover layer COV2 disposed on a second pixel electrode PE2.

The first cover layer COV1 may extend in the second direction Y over the first pixel electrode PE1 and the protective layer 115. The first cover layer COV1 may include a first cover part COVL1 spaced apart from the substrate 105 and extending substantially in parallel to the top surface of the substrate 105, and a first sidewall part COVW1 connecting the first cover part COVL1 and the top of the substrate 105 or the top surface of the protective layer 115.

The first cover part COVL1 may be spaced apart from the top surface of the protective layer 115, and the first cover part COVL1 and the first sidewall part COVW1 may define the first cavity CV1 together with the protective layer 115. More particularly, the first cover part COVL1 may be spaced upwardly apart from the protective layer 115 in a region corresponding to the first sub-pixel SPX1, and the first sidewall part COVW1 may connect the protective layer 115 and the first cover part COV1 to form a predetermined gap between the first cover layer COV1 and the protective layer 115. In a region that does not corresponding to the first sub-pixel SPX1, the first cover layer COV1 and the protective layer 115 may not form a gap therebetween. As a result, the first cavity CV1 may be formed to extend in the second direction Y. According to an exemplary embodiment of the present invention, the direction in which the first cover layer COV1 extends may vary.

Referring to FIG. 5, since the first cover layer COV1 is not formed on a side of the first cavity CV1 facing the second cavity CV2 with the first gate line GL1 interposed therebetween, the first cavity CV1 may be open at the corresponding side thereof. For convenience, the open side of the first cavity CV1 will hereinafter be referred to as a liquid crystal inlet EN. The first liquid crystal layer LCL1 may be formed by injecting liquid crystal molecules LC into the first cavity CV1 through the liquid crystal inlet EN of the first cavity CV1.

Similarly, the second cover layer COV2 may extend in the second direction Y over the second pixel electrode PE2 and the protective layer 115. The second cover layer COV2 may include a second cover part COVL2 spaced apart from the substrate 105 and extending substantially in parallel to the top surface of the substrate 105, and a second sidewall part COVW2 connecting the second cover part COVL2 and the top of the substrate 105 or the top surface of the protective layer 115. The second cover part COVL2 may be spaced apart from the top surface of the protective layer 115, and the second cover part COVL2 and the second sidewall part COVW2 may define the second cavity CV2 together with the protective layer 115.

Referring back to FIG. 5, since the second cover layer COV2 is not formed on a side of the second cavity CV2 facing the first cavity CV1 with the first gate line GL1 interposed therebetween, the second cavity CV1 may be open at the corresponding side thereof to form a liquid crystal inlet EN. The second liquid crystal layer LCL2 may be formed by injecting liquid crystal molecules LC into the second cavity CV2 through the liquid crystal inlet EN of the second cavity CV2. According to an exemplary embodiment of the present invention, the location of the liquid crystal inlet EN of the second cavity CV2 may vary. More particularly, the liquid crystal inlet EN may be provided at a side of the second cavity CV2 facing the second gate line GL2, and a side of the second cavity CV2 facing the first cavity CV1 with the first gate line GL1 interposed therebetween may be covered with the second cover layer COV2.

The first and second cover layers COV1 and COV2 may be formed of organic or inorganic insulating layers. The first and second cover layers COV1 and COV2 may be formed as single layers or as multilayers, for example, a triple layer. More specifically, the first and second cover layers COV1 and COV2 may have a triple layer structure in which an inorganic insulating layer, an organic insulating layer, and an inorganic insulating layer are sequentially stacked.

A width W1 of the first cavity CV1 in a direction perpendicular to the top surface of the substrate 105 may be different from a width W2 of the second cavity CV2 in the direction perpendicular to the top surface of the substrate 105. For example, the width W1 of the first cavity CV1 may be greater than the width W2 of the second cavity CV2. More particularly, the distance from the top surface of the protective layer 115 to the bottom surface of the first cover part COVL1 may be greater than the distance from the top surface of the protective layer 115 to the bottom surface of the second cover part COVL2.

The formation of the first and second cavities CV1 and CV2 will hereinafter be described. First and second sacrificial layers (not illustrated) are formed on the first and second pixel electrodes PE1 and PE2, respectively, to have different heights from each other by using a slit mask (not illustrated) or a halftone mask (not illustrated). Thereafter, the first and second common electrodes CE1 and CE2 are respectively formed on the first and second sacrificial layers and the protective layer 115. The first and second cover layers COV1 and COV2 are formed on the first and second common electrodes CE1 and CE2, respectively, and the protective layer 115. Thereafter, the first and second sacrificial layers are removed by wet etching. As a result, the first and second cavities CV1 and CV2 may be formed to have different widths from each other, i.e., the widths W1 and W2.

As a thickness TH1 of the first cover part COVL1 may be substantially the same as a thickness TH2 of the second cover part COVL2, a height H1 from the top surface of the substrate 105 to the top surface of the first cover part COVL1 may be greater than a height H2 from the top surface of the substrate 105 to the top surface of the second cover part COVL2. According to an exemplary embodiment of the present invention, the height H1 of the first cover part COVL1 and the height H2 of the second cover part COVL2 may be substantially similar to each other, while the width W1 of the first cavity CV1 may be formed to be greater than the width W2 of the second cavity CV2. More particularly, the thickness TH2 of the second cover part COVL2 may be greater than the thickness TH1 of the first cover part COVL1.

The common electrodes CE may be disposed on the substrate 105. More specifically, the common electrodes CE may be spaced apart from the pixel electrodes PE with the liquid crystal layer (LCL1 and LCL2) interposed therebetween. Each of the common electrodes CE may include a first common electrode CE1 formed in a region corresponding to the first sub-pixels SPX1 of an array of pixels PX, and a second common electrode CE2 formed in a region corresponding to the second sub-pixels SPX2 of the array of pixels PX. The first common electrode CE1 may extend in the first direction X to overlap the first sub-pixels SPX1 of the array of pixels PX, and the second common electrode CE2 may extend in the second direction Y to overlap the second sub-pixels SPX2 of the array of pixels PX.

The first liquid crystal layer LCL1 may be disposed in the first cavity CV1, and the second liquid crystal layer LCL2 may be disposed in the second cavity CV2. Accordingly, the first common electrode CE1 may face the first pixel electrode PE1 with the first liquid crystal layer LCL1 interposed therebetween, and the second common electrode CE2 may face the second pixel electrode PE2 with the second liquid crystal layer LCL2 interposed therebetween. The first common electrode CE1 may form an electric field E1 with the first pixel electrode PE1 to control the first liquid crystal layer LCL1, and the second common electrode CE2 may form an electric field E2 with the second pixel electrode PE2 to control the first liquid crystal layer LCL2.

According to an exemplary embodiment of the present invention, the first common electrode CE1 may be disposed along the bottom surface of the first cover layer COV1, and the second common electrode CE2 may be disposed along the bottom surface of the second cover layer COV2.

The first and second common electrodes CE1 and CE2 may be spaced apart from each other by, for example, the first gate line GL1 and the first common voltage line CL1 interposed therebetween. The first and second common electrodes CE1 and CE2 may be electrically connected to the first protrusion $CL_{p1}$ of the first common voltage line CL1 and the second protrusion $CL_{p2}$ of the second common voltage line CL2, respectively, via the second and third contact holes cnt2 and cnt3, respectively, which are formed through the protective layer 115, the insulating layer 110, and the gate insulating layer GIL. Accordingly, the first and second common electrodes CE1 and CE2 may be provided with a common electrode by the first and second common voltage lines CL1 and CL2, respectively. Since the first and second common voltage lines CL1 and CL2 are provided with the same common voltage, the first and second common electrodes CE1 and CE2 may also be provided with the same common voltage.

A pair of adjacent first and second pixel electrodes PE1 and PE2 (in the second direction Y) from two different pixels PX may share the same common electrode. For example, a second common electrode CE2 may be formed on the second and first pixel electrodes PE2 and PE1 that are disposed next to each other between the first gate line GL1 and the second gate line GL2. Similarly, a first common electrode CE1 may be formed on a pair of adjacent first and second pixel electrodes PE1 and PE2 (in the second direction Y) from two different pixels PX.

A distance D1 between the first pixel electrode PE1 and the first common electrode CE1 may be different from a distance D2 between the second pixel electrode PE2 and the second common electrode CE2. According to an exemplary embodiment of the present invention, when the width W1 of the first cavity CV1 is greater than the width W2 of the second cavity CV2, the distance D1 between the first pixel electrode PE1 and the first common electrode CE1 may be greater than the distance D2 between the second pixel electrode PE2 and the second common electrode CE2.

The pixel electrodes PE and the common electrodes CE may include a transparent conductive material or an opaque conductive material, such as a metal. A transparent conductive material or an opaque conductive material may be selectively used as the material of the pixel electrodes PE and the common electrodes CE depending on a mode of operation of the display device 100. For example, when the display device 100 operates as a transmissive-type display device in which a backlight unit is disposed below the substrate 105, the pixel electrodes PE and the common electrodes CE may all be formed of a transparent conductive material. Alternatively, when the display device 100 operates as a reflective-type display device that does not require an additional light source module, the pixel electrodes PE may be formed of an opaque conductive material (particularly, a reflective material), and the common electrodes PE may be formed of a transparent conductive material. The transparent conductive material may include a transparent conductive oxide, such as ITO, IZO, or indium tin zinc oxide (ITZO). The opaque conductive material may include a metal, such as Ni, Cr, Mo, Al, Ti, Cu, W, or an alloy thereof. The elements of the display device 100, other than the pixel electrodes PE and the common electrodes CE, such as the first and second cover layers COV1 and COV2, may also be formed of either a transparent material or an opaque material depending on the mode of operation of the display device 100.

The alignment layer 135 may be formed on the pixel electrodes PE and the common electrodes CE, in the cavities (CV1 and CV2). The alignment layer 135 may be disposed between the first pixel electrode PE1 and the first liquid crystal layer LCL1, and between the second pixel electrode PE2 and the second liquid crystal layer LCL2, respectively. The alignment layer 135 may be formed of an alignment material, such as polyamic acid, polysiloxane, or polyimide.

The first and second liquid crystal layers LCL1 and LCL2 may be formed by injecting liquid crystal molecules LC into the first and second cavities CV1 and CV2, respectively. The liquid crystal molecules LC may be aligned by the alignment layer 135, and may have optical anisotropy. The liquid crystal molecules LC may be driven by an electric field to allow or block light transmission through the first and second liquid crystal layers LCL1 and LCL2 so as to display an image. According to an exemplary embodiment of the present invention, the first and second liquid crystal layers LCL1 and LCL2 may be formed of the same material.

A sealing layer 140 may be formed to seal the liquid crystal inlets EN of the first and second cavities CV1 and CV2. The sealing layer 140 may be formed of a sealing material that does not react with the liquid crystal molecules LC injected into the first and second cavities CV1 and CV2. According to an exemplary embodiment of the present invention, the sealing layer 140 may be formed of an organic polymer. The organic polymer may include poly (p-xylene) polymer, i.e., parylene.

The sealing layer 140 is illustrated as being located only at the liquid crystal inlets EN of the first and second cavities CV1 and CV2, respectively. Alternatively, the sealing layer 140 may also be formed on the first and second cover layers COV1 and COV2 to cover the first and second cover layers COV1 and COV2.

In the display device 100 according to an exemplary embodiment of the present invention, the TFTs "TFT" may be turned on in response to receiving a gate signal via the gate lines GL1, GL2, . . . , GLn. When the TFTs "TFT" are turned on, data signals provided via the data lines DL1, DL2, . . . , DLm may be transmitted to the pixel electrodes PE via the TFTs "TFT", and a common voltage provided via the common voltage lines CL1, CL2, . . . , CLo may be applied to the common electrodes CE. Accordingly, an electric field may be generated between the pixel electrodes PE and the common electrodes CE to drive the liquid crystal molecules LC in the liquid crystal layer (LCL1 and LCL2) so as to display an image.

The driving of the display device 100 on a pixel level will hereinafter be described.

Figure 8:
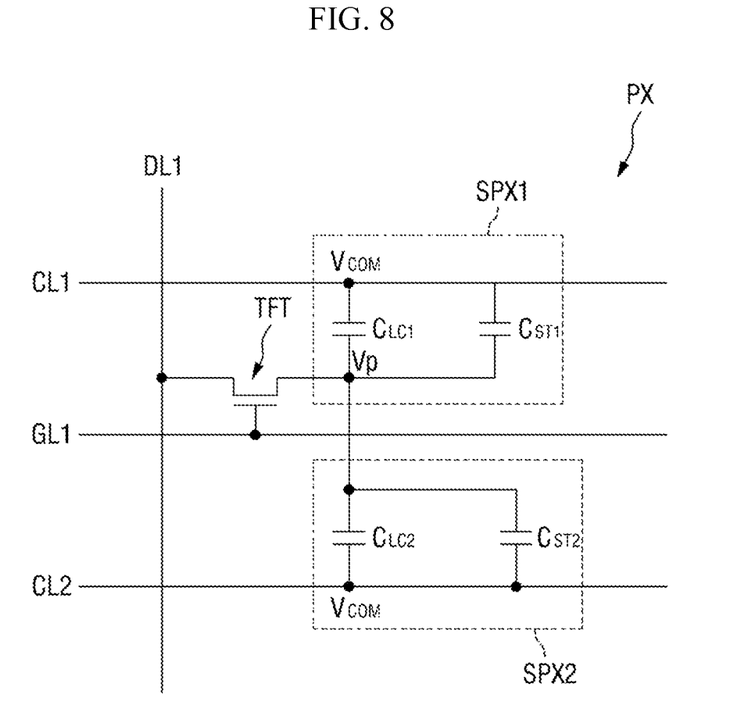
FIG. 8 is a circuit diagram of a pixel illustrated in FIG. 1.

FIG. 8 is a circuit diagram of a pixel illustrated in FIG. 1.

Referring to FIG. 8, a pixel PX may include a TFT "TFT", a first liquid crystal capacitor $C_{LC1}$, a second liquid crystal capacitor $C_{LC2}$, a first storage capacitor $C_{ST1}$, a second storage capacitor $C_{ST2}$, a first pixel electrode (PE1 of FIGS. 1 to 7), a second pixel electrode (PE2 of FIGS. 1 to 7), a first common electrode (CE1 of FIGS. 1 to 7), and a second common electrode (CE2 of FIGS. 1 to 7).

In response to receiving a gate-on signal via the first gate line GL1, the TFT "TFT" may be turned on, and a data voltage (or a pixel voltage $V_p$) supplied via the first data line DL1 may be applied to the first and second pixel electrodes PE1 and PE2 via the TFT "TFT". More particularly, the first and second pixel electrodes PE1 and PE2 may be provided with the same pixel voltage $V_p$.

A common voltage $V_{com}$ is applied to the first common electrode CE1 via the first common voltage line CL1, and the common voltage $V_{com}$ is applied to the second common electrode CE2 via the second common voltage line CL2. More particularly, the first and second common electrodes CE1 and CE2 may be provided with the same common voltage $V_{com}$.

A first voltage V1, which corresponds to the difference between the pixel voltage $V_p$ applied to the first pixel electrode PE1 and the common voltage $V_{com}$ applied to the first common electrode CE1, may be applied to a first liquid crystal layer (LCL1 of FIGS. 1 to 7) or the first liquid crystal capacitor $C_{LC1}$. A second voltage V2, which corresponds to the difference between the pixel voltage $V_p$ applied to the second pixel electrode PE2 and the common voltage $V_{com}$ applied to the second common electrode PE2, may be applied to a second liquid crystal layer (LCL2 of FIGS. 1 to 7) or the second liquid crystal capacitor $C_{LC2}$.

As a result, light may be transmitted through the first and second liquid crystal layers LCL1 and LCL2 at a transmissivity corresponding to a first electric field E1 corresponding to the first voltage V1 and a transmissivity corresponding to a second electric field E2 corresponding to the second voltage V2.

Since the same pixel voltage $V_p$ is applied to both the first and second pixel electrodes PE1 and PE2 and the same common voltage $V_{com}$ is applied to both the first and second common electrodes CE1 and CE2, the first and second voltages V1 and V2 may have substantially the same level.

The relationship between the first voltage V1, the first electric field E1, and the distance D1 between the first pixel electrode PE1 and the first common electrode CE1, and the relationship between the second voltage V2, the second electric field E2, and the distance D2 between the second pixel electrode PE2 and the second common electrode CE2 may be defined as the following equations:

$$V1 = E1 * D1; \text{ and}$$

$$V2 = E2 * D2 \qquad \text{[Equation 1]}$$

V1 and V2 denote the first and second voltages, respectively. E1 and E2 denote the first and second electric fields, respectively. D1 and D2 denote the distance between the first pixel electrode and the first common electrode and the distance between the second pixel electrode and the second common electrode, respectively.

The first and second voltages V1 and V2 may be substantially the same, and the distance D1 may be greater than the distance D2. Accordingly, the first electric field E1 may be weaker than the second electric field E2. More particularly, a weaker electric field may be applied to the first liquid crystal layer LCL1 than to the second liquid crystal layer LCL2.

Accordingly, a first sub-pixel SPX1 of the pixel PX may be implemented as a low-gray pixel (or a low-level pixel), and a second sub-pixel SPX2 of the pixel PX may be implemented as a high-gray pixel (or a high-level pixel). Thus, an orientation of the alignment of liquid crystal molecules may vary from one pixel PX to another pixel PX. Therefore, the visibility of the display device 100 may be improved.

Even though the first and second sub-pixels SPX1 and SPX2 are both provided with the same pixel voltage and the same common voltage, the first and second sub-pixels SPX1 and SPX2 may still be implemented as a low-gray pixel (or a low-level pixel) and a high-gray pixel (or a high-level pixel), respectively. Accordingly, the structure of the display device 100 may be simplified, and as a result, the fabrication of the display device 100 may also be simplified.

Also, even though the first and second sub-pixels SPX1 and SPX2 are both driven using one TFT "TFT", the first and second sub-pixels SPX1 and SPX2 may still be implemented as a low-gray pixel (or a low-level pixel) and a high-gray pixel (or a high-level pixel), respectively. Accordingly, the visibility of the display device 100 may improve with a simple structure, and the aperture ratio of the display device 100 may be improved due to a reduced number of required TFTs "TFT".

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A display device, comprising:
   a substrate; and
   pixels disposed on the substrate, each of the pixels comprising a first sub-pixel and a second sub-pixel,
   wherein:
   the first sub-pixel comprises:
     a first cover layer defining a first cavity on the substrate;
     a first liquid crystal layer disposed in the first cavity; and
     a first pixel electrode and a first common electrode configured to apply an electric field to the first liquid crystal layer;
   the second sub-pixel comprises:
     a second cover layer defining a second cavity on the substrate;
     a second liquid crystal layer disposed in the second cavity; and
     a second pixel electrode and a second common electrode configured to apply an electric field to the second liquid crystal layer; and
   a first distance between the first pixel electrode and the first common electrode is different from a second distance between the second pixel electrode and the second common electrode,
   wherein the display device further comprises a connecting electrode connected to the first pixel electrode and the second pixel electrode.

2. The display device of claim 1, wherein a first width of the first cavity in a direction perpendicular to the substrate is different from a second width of the second cavity in a direction perpendicular to the substrate.

3. The display device of claim 1, wherein:
   the first cover layer comprises:
     a first cover part spaced apart from the substrate and extending in parallel to a top surface of the substrate; and
     a first sidewall part connecting the first cover part and the top surface of the substrate; and
   the second cover layer comprises:
     a second cover part spaced apart from the substrate and extending in parallel to the top surface of the substrate; and
     a second sidewall part connecting the second cover part and the top surface of the substrate.

4. The display device of claim 3, wherein:
   the first pixel electrode is disposed between the substrate and the first liquid crystal layer;
   the second pixel electrode is disposed between the substrate and the second liquid crystal layer;
   the first common electrode is disposed between the first liquid crystal layer and the first cover part; and
   the second common electrode is disposed between the second liquid crystal layer and the second cover part.

5. The display device of claim 1, wherein:
   the first and second pixel electrodes are supplied with the same data voltage; and
   the first and second common electrodes are supplied with the same common voltage.

6. The display device of claim 1, further comprising a thin-film transistor (TFT) disposed on the substrate and electrically connected to the connecting electrode.

7. The display device of claim 6, wherein the TFT is disposed between the first and second sub-pixels in a direction parallel to the substrate.

8. The display device of claim 6, further comprising:
   a gate line disposed on the substrate; and
   a data line intersecting the gate line,
   wherein the TFT is electrically connected to the gate line and the data line.

9. The display device of claim 8, further comprising a common voltage line disposed on the substrate and to which a common voltage is configured to be applied,
   wherein the first and second common electrodes are electrically connected to the common voltage line.

10. The display device of claim 1, further comprising a sealing layer configured to seal the first and second cavities.

11. The display device of claim 1, further comprising:
    a first color filter disposed between the substrate and the first pixel electrode;
    a second color filter disposed between the substrate and the second pixel electrode; and
    a black matrix disposed on at least one side of the first or second color filters.

12. A display device, comprising:
    a substrate; and
    pixels disposed on the substrate, each of the pixels comprising a first sub-pixel and a second sub-pixel,
    wherein:
    the first sub-pixel comprises:
      a first pixel electrode disposed on the substrate;
      a first cover layer disposed on the first pixel electrode, the first cover layer defining a first cavity on the substrate; and
      a first common electrode disposed on a bottom surface of the first cover layer and facing the first pixel electrode;

the second sub-pixel comprises:
- a second pixel electrode disposed on the substrate;
- a second cover layer disposed on the second pixel electrode, the second cover layer defining a second cavity on the substrate; and
- a second common electrode disposed on a bottom surface of the second cover layer and facing the second pixel electrode; and a first width of the first cavity in a direction perpendicular to the substrate is different from a second width of the second cavity in the direction perpendicular to the substrate, wherein the display device further comprises a connecting electrode connected to the first pixel electrode and the second pixel electrode.

13. The display device of claim 12, further comprising a TFT disposed on the substrate and electrically connected to the connecting electrode.

14. The display device of claim 13, wherein the TFT is disposed between the first and second sub-pixels.

15. The display device of claim 14, further comprising:
a gate line disposed on the substrate; and
a data line intersecting the gate line,
wherein the TFT comprises:
- a gate electrode electrically connected to the gate line;
- a source electrode electrically connected to the data line; and
- a drain electrode electrically connected to the connecting electrode.

16. The display device of claim 15, further comprising a common voltage line disposed on the substrate and to which a common voltage is applied,
wherein the first and second common electrodes are electrically connected to the common voltage line.

17. The display device of claim 12, further comprising:
- a first color filter disposed between the substrate and the first pixel electrode;
- a second color filter disposed between the substrate and the second pixel electrode; and
- a black matrix disposed on at least one side of the first or second color filters.

18. The display device of claim 12, further comprising:
- a liquid crystal layer disposed in the first and second cavities; and
- a sealing layer sealing the first and second cavities.

19. The display device of claim 1, wherein a first thickness of the first cover layer is substantially similar to a second thickness of the second cover layer.

20. The display device of claim 1, wherein a third distance between the substrate and a top surface of the first cover layer is different from a fourth distance between the substrate and a top surface of the second cover layer.

* * * * *